United States Patent [19]

Jacobsen et al.

[11] 4,266,898
[45] May 12, 1981

[54] BALE CARRIER

[75] Inventors: Merlin D. Jacobsen; David O. Jacobsen, both of Dallas; Claude E. Harrison, Lucas, all of S. Dak.

[73] Assignee: H & J Sales, Dallas, S. Dak.

[21] Appl. No.: 32,631

[22] Filed: Apr. 23, 1979

Related U.S. Application Data

[63] Continuation of Ser. No. 725,373, Sep. 22, 1976, abandoned.

[51] Int. Cl.³ .......................... A01D 87/12; B60P 1/02
[52] U.S. Cl. ............................ 414/24.5; 280/43.23; 414/459
[58] Field of Search ............... 414/24.5, 24.6, 458, 414/459, 460, 911, 461; 280/43.11, 43.23, 43.24

[56] References Cited

U.S. PATENT DOCUMENTS

| | | | |
|---|---|---|---|
| 1,244,783 | 10/1917 | Ruckes | 414/458 |
| 2,711,329 | 6/1955 | Fritz | 280/43.23 |
| 2,780,475 | 2/1957 | Koerner | 280/43.23 |
| 3,039,633 | 6/1962 | Mindrum et al. | 414/458 |
| 3,271,042 | 9/1966 | Flodin | 280/43.23 |
| 3,536,339 | 10/1970 | Fichtenberg | 280/43.23 X |
| 3,747,787 | 7/1973 | Sloan et al. | 414/458 |
| 4,008,902 | 2/1977 | Dill | 280/43.24 X |

FOREIGN PATENT DOCUMENTS

| | | | |
|---|---|---|---|
| 1781254 | 11/1970 | Fed. Rep. of Germany | 280/43.23 |
| 1278053 | 10/1961 | France | 280/43.23 |

*Primary Examiner*—Leslie J. Paperner
*Attorney, Agent, or Firm*—Henderson & Sturm

[57] ABSTRACT

Bale carrier apparatus for rapidly and easily handling and transporting large cylindrical hay bales. The bale carrier has a main support frame including a pair of spaced apart longitudinal support arms and hitch means connected to one end of the main support frame for detachably connecting the support frame to a towing vehicle. Means are provided to selectively raise or lower the support arms in relation to the ground surface between a lowered position wherein the support arms are positioned at a height below the axial height of a bale to be loaded and spaced apart by a distance less than the diameter of the bale, and a raised position wherein the support arms supportively engage the bale so as to lift the bale above the ground to a load carrying position. In operation, the support frame is positioned adjacent the bale to be loaded so that the axis of the bale projects between the support arms. The support arms are placed in their lowered position so that the support frames may be moved so as to position the bale between the support arms. The support arms are thereupon moved to their raised position so as to supportively engage the bale and raise it to a load carrying position.

5 Claims, 5 Drawing Figures

BALE CARRIER

This is a continuation of application Ser. No. 725,373 filed on Sept. 22, 1976, now abandoned.

BACKGROUND OF THE INVENTION

1. Field of the Invention

This invention relates generally to carrying apparatus. More specifically, this invention relates to a towable bale carrying apparatus for large cylindrical hay bales and includes a main support frame having support arms which may be lowered to ground level, slid beneath one or more large hay bales and then raised to lift the bale or bales off of the ground for transporting.

2. Description of the Prior Art

It is often advantageous to bale and store hay in large cylindrical bales of the type typically ranging from five to six feet in length and from six to seven feet in diameter. Such bales typically need not be stored indoors, and significantly reduce the time and expense involved in processing and handling the well-known small rectangular hay bales. The handling and transporting of such large cylindrical bales has posed very difficult problems due to the large size, the cylindrical shape and the heavy weight of the bales.

Various prior art devices have been developed to generally handle and carry large bulky objects. Such carrying devices typically include a wheeled trailer portion having a cargo bed which can be lowered at one end thereof to slidably or rollingly accept a cargo. While such devices have greatly facilitated loading of cargo onto the normally elevated cargo bed, the load to be carried must either be physically moved by its own power or by external means up the inclined surface of the tilted cargo bed and must be retainably held in that portion until the cargo bed is tilted back to its elevated transporting position. Typically, the load is pulled onto the cargo bed by means of a winch apparatus or the like, see for example U.S. Pat. Nos. 2,577,246 (Hill) and 3,012,682 (Williamson).

While the tiltable cargo bed apparatus has wide applicability to moving cargo in general, such apparatus is impractical and too costly for routinely handling and carrying large cylindrical hay bales. The physical properties of the large hay bale make it very difficult to safely and efficiently advance the bale up the inclined bed and to maintain its position thereon while the cargo bed is being restored to its elevated transporting position. Further, with the use of such apparatus, it becomes virtually impossible to load and carry more than one such large bale at a time. In addition, a force imparting vehicle such as a tractor which is physically separate from the towing vehicle is generally required to slide the bale unto the cargo bed. Besides being generally impractical, due to the cylindrical shape and heavy weight of such bales, movement of large bales on such flat cargo bed apparatus can be dangerous to work with should a bale roll off of the cargo bed.

Prior art bale lifting and handling apparatus has been designed for specifically handling such large cylindrical bales, see for example U.S. Pat. No. 3,877,595 (Edelman). Such special-purpose bale handling apparatus typically includes a cradle mechanism and clamping means for securely engaging and lifting single bales by grasping the bales along their outer circumference. While such apparatus specifically address the large bale handling and transporting problem, they are cumbersome to use and enable handling and transporting of only one bale at a time.

SUMMARY OF THE INVENTION

The present invention solves problems associated with the prior art carriers as applied to handling and moving large cylindrical hay bales. It is a trailer having a main support frame characterized by a pair of generally parallel, longitudinally extending support arms. These support arms, which form a part of the support frame, are operable between a lowered position wherein the support arms are positioned at a height below the axial height of a bale to be loaded and are spaced apart by a distance less than the diameter of the bale, and a raised position wherein the support arms supportively engage the bale so as to lift the bale above the ground to a load carrying position.

The preferred emblodiment of the present invention includes a support frame having a pair of elongate spaced apart support arms connected at one end by a transverse frame member. Wheel assemblies are provided on either side of the support frame. Lever arms are pivotally connected at one end to each of the wheel assemblies and are pivotally attached at their opposite ends to the support arms, so that the wheel assemblies are capable of rotating relative to the support frame through an arch determined by the distance between the ends of the lever arms attached to the wheel assemblies and the point of pivotal attachment of the lever arms to the support arms.

Hitch means are pivotally connected to that end of the support frame adjacent the transverse frame member. The hitch means include a coupler suitable for detachable connection to a towing vehicle and interconnecting drawbar means pivotally attaching the coupler to the support frame. With the pivotal connection, the support frame may be lowered at that end thereof connected to the transverse frame member, while the coupler remains at a constant height above the ground.

One or more hydraulic cylinders on the support frame exert forces to the lever arms connected to the wheel assemblies by means of connecting rods to selectively raise or lower the support frame. By applying sufficient force to the hydraulically activated connecting rods, the lever arms will be swung through an arch which causes the wheel assemblies to rotate relative to the support frame. This rotating movement raises or lowers the support frame relative to the surface upon which the wheels rest. The connecting rods for each of the wheel assemblies are structurally interconnected so that the wheel assemblies rotate evenly with respect to the support frame.

When disposed in a lower position, the support frame is positioned in substantially parallel relation to the ground surface at a height below the axial height of the wheel assemblies and in close proximity to the ground surface, to enable said support arms to slide along the ground surface into underlying supportive engagement with one or more large cylindrical barrels. A roller mounted to the support frame near its leading end (i.e. near the hitch means end) engages the ground surface when the carrier apparatus is disposed in a lowered position, to prevent gouging of the hitch means and the support frame into the ground surface. When in a raised position the support arms are positioned in substantially parallel relation to the ground surface at a height above the axial height of said wheel assemblies for carrying the large cylindrical bales supportingly engaged thereby.

Upwardly extending transverse braces having an arch or generally inverted U-shape connect the support arms near their rearwardly disposed free ends so as to provide additional structural support. The arch shaped braces are sized to enable unobstructed passage of large cylindrical bales therebelow as guided by the support arms.

For loading a bale, the support frame is longitudinally aligned with the bale or bales, is placed in its lowered position, and is backed by the towing vehicle into underlying engagement with the bale or bales. The support frame is then hydraulically lifted to its raised portion and is ready for transporting the bale or bales. To unload a bale or bales carried by the carrier apparatus, the support frame is dropped to its lowered position, causing the bale or bales carried thereby to frictionally engage the ground surface, and the towing vehicle merely advances the support frame longitudinally out of engagement with the bales.

DETAILED DESCRIPTION OF THE PREFERRED EMBODIMENT

Figure 2:
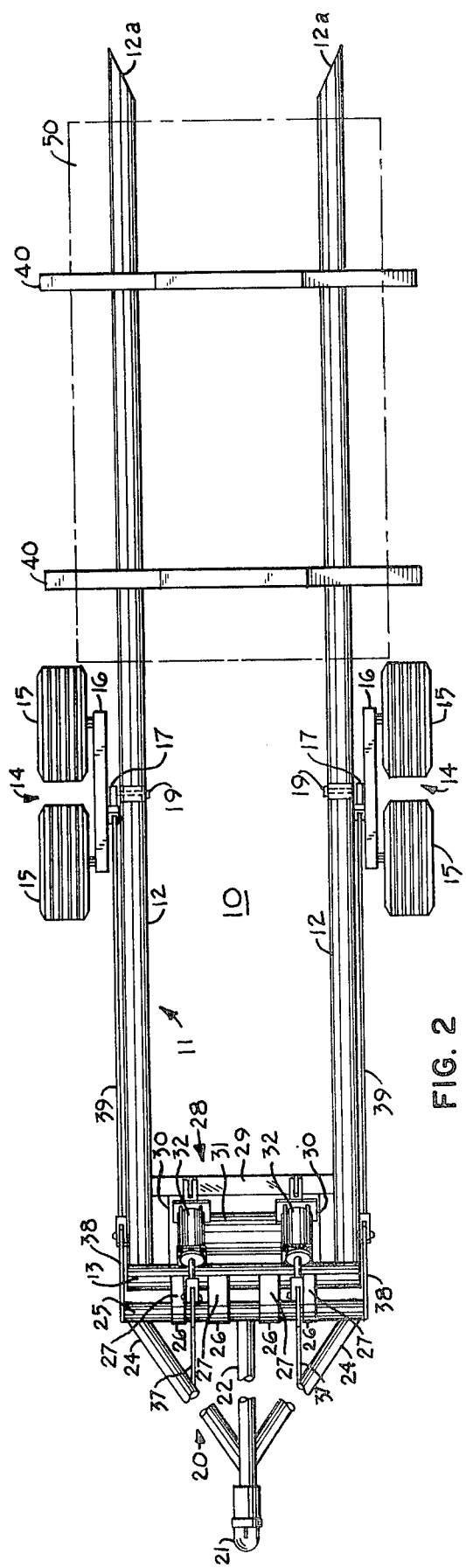
FIG. 2 is a view in top plan of the bale carrier apparatus disclosed in FIG. 1.

Referring to the drawing, wherein like numerals represent like parts throughout the several views, there is provided a large bale carrier generally designated at 10 including a main support frame 11 having a pair of elongate spaced apart longitudinal frame members or support arms 12 connected at one end by a transverse frame member 13. It is contemplated that the support arms 12 and the transverse frame member 13 be secured to one another by welding or other appropriate means and that they comprise metal piping of sufficient strength to support the bale weight to be carried thereby, although other materials and configurations may be acceptable. It is also contemplated that the free ends of the support arms 12 be tapered from their rearmost edges and toward the inwardly disposed portions of the frame members, as illustrated at 12A in FIG. 2.

Figure 3:
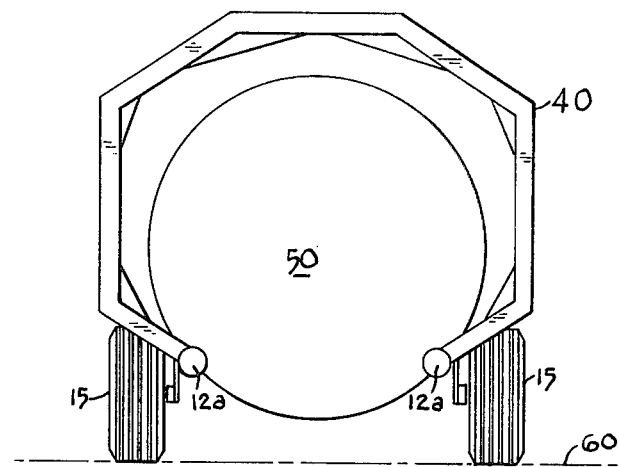
FIG. 3 is a view in rear elevation of the bale carrier apparatus disclosed in FIG. 1.
Figure 4:
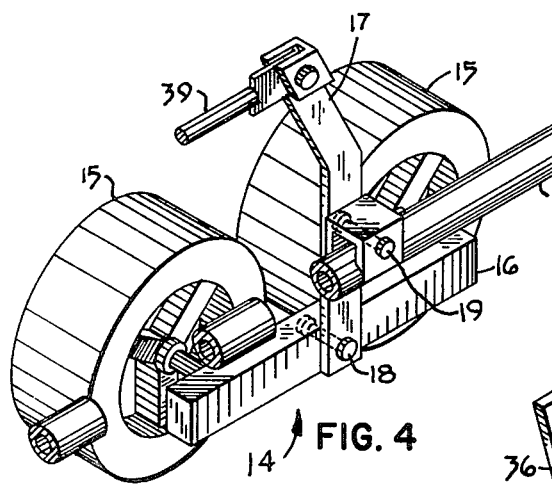
FIG. 4 is an enlarged view in perspective of one of the wheel assemblies of the bale carrier apparatus disclosed in FIG. 1.
Figure 5:
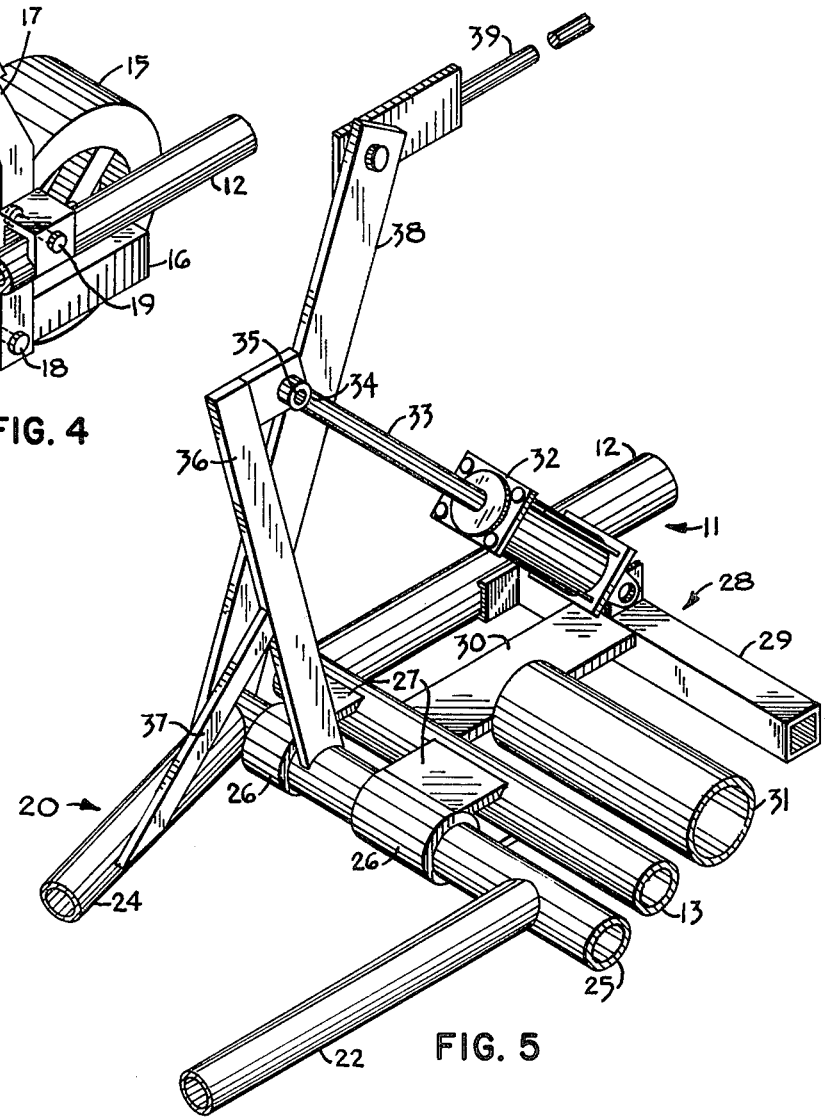
FIG. 5 is an enlarged view in perspective of the leading portion end of the support frame of the bale carrier apparatus disclosed in FIG. 1, with portions thereof broken away.

A pair of transverse arch or inverted U-shaped brace members 40 connect the support arms 12 adjacent their rearmost ends and intermediate their length to provide structural stability to the support arms 12. The brace members 40 are sized (see FIG. 3) to overlay a load of cylindrical bales (illustrated at 50) carried by the support arms 12 and so as not to interfere with or impede the loading or unloading of the bales.

The main support frame 11 is provided with supporting wheel assemblies 14 so that it may be moved over a ground surface. In the preferred embodiment, it is preferable that the wheel assemblies 14 comprise tandem wheel assemblies, each having two wheels 15 mounted for rotation to a common wheel frame 16. One wheel assembly 14 is mounted to each of the support arms 12. A lever arm 17 is pivoted at one end thereof to each wheel frame 16 by means of a first pivot pin 18. Each lever arm 17 is further pivotally connected to one of the respective support arms 12 by a second pivot pin 19 disposed along the lever arm 17 and spaced from its one end. In this manner, the wheel assemblies 14 are connected to each of the support arms 12 through the lever arms 17. It will be appreciated that, depending upon the orientation of the lever arms 17 relative to the main support frame 11, the main support frame 11 may be disposed above or below the axial height of the wheel assemblies 14. While a tandem wheel assembly 14 has been disclosed, it will be understood that other suitable wheel assemblies 14 attached to the main support frame 11 by a lever arm 17 which rotates relative to the main support frame 11, may also be employed within the teachings and scope of the present invention.

Hitch means generally illustrated at 20 are attached to the main support frame 11 adjacent the transverse frame member 13. The hitch means 20 include a coupler 21 suitable for detachable connection to a standard ball-type hitch of a towing vehicle (not shown). In a preferred embodiment, the coupler 21 will accept a two-inch ball. A main drawbar 22 is pivotally connected to the coupler 21 by means of a pivot pin 23. The pivotal connection enables the main drawbar 22 to be pivoted downwardly relative to the coupler 21. Side drawbars 24 are attached to the main drawbar 22 rearwardly of the pivot pin 23. The side drawbars 24 diverge from the main drawbar 22 in a rearward direction.

A plurality of collar members 26 are secured to the transverse frame member 13 and are supported outwardly therefrom by means of brackets 27. A towbar 25 rotatably extends through the collar members 26 and is secured to the free ends of the main drawbar 22 and the side drawbars 24 by welding or other appropriate means. It will be appreciated that the hitch means 20 is free to pivot relative to the main support frame 11 and that the hitch means 20 is capable of connecting the main support frame 11 to the hitch of the towing vehicle while maintaining the main support frame 11 on a lower horizontal level than the hitch.

A subframe 28 is attached to the main support frame 11 adjacent the transverse frame member 13 rearward of the towbar 25. The subframe 28 includes a cross brace 29 secured to each of the support arms 12 and two side braces 30 attached to the transverse frame member 13 and the cross brace 29. A roller 31 is journaled for rotation in the side braces 30 and extends in a direction parallel to the transverse frame member 13. The roller 31 is of sufficient radius to extend at least partially beneath the support arms 12. When the main support frame 11 is lowered to its lowermost position, the roller 31 engages the ground adjacent the towbar 25 thus preventing the hitch means 20 from gouging into the ground upon backing of the carrying apparatus 10 to position the main support frame 11 to underlie the bale or bales of hay to be carried thereby. While a roller has been disclosed, it will be understood that other suitable means for engaging the ground for preventing the hitch means 20 from gouging into the ground could be used within the spirit and intent of this invention.

In order to operate the main support frame 11 between its lowered and raised positions, a pair of hydraulic cylinders 32 are provided, one of each cylinders 32 being used to operate each of the lever arms 17. While a pair of hydraulic cylinders 32 are disclosed, it will be appreciated that a single hydraulic cylinder could also be used within the spirit and intent of this invention. Each of the hydraulic cylinders 32 is mounted to the cross brace 29 by bolting or other appropriate means. The hydraulic cylinders 32 include a piston (not shown) operating therein and connected to a piston rod 33 extending outwardly from the cylinders 32, as is well known in the art. The outer end 34 of each of the piston rods 33 is pivotally attached by means of a pivot pin 35 to one end of a moment arm 36. The second ends of the moment arms 36 are rigidly connected to the towbar 25. Upon operation of the hydraulic cylinders 32 so as to move the piston rod 33 outwardly from the hydraulic cylinder 32, a force is applied to one end of the moment arm 36 through the pivot pin 35. The force applied to the moment arm 36 creates a moment about the towbar 25. A support strut 37 is attached between each of the moment arms 36 and the respectively associated side drawbars 34 for increased structural strength. The application of a moment as above described about the towbar 25 results in a counterclockwise pivoting of the hitch means 20 with respect to the main support frame 11 when viewed as from FIG. 1.

Two actuating arms 38 are rigidly attached at opposing ends of the towbar 25. The actuating arms 38 are mounted generally perpendicularly to the towbar 25 and extend in a generally upward direction. As the towbar 25 is rotated upon movement of the piston rods 33 within the hydraulic cylinders 32, the actuating arms 38 rotate with the towbar 25. Connecting rods 39 are attached respectively to the free ends of the actuating arms 38 and are secured at their respective opposite ends to the lever arms 17 associated with the wheel assemblies 14.

In operation, a bale carrier 10 is operable between first and second positions. The first or raised position corresponds to the full line drawings in FIG. 1 wherein the main support frame 11 is positioned above the axial height of the wheels 15 of the wheel assemblies 14. In this raised position the main support frame 11 is maintained approximately level with the hitch of the towing vehicle so that the hitch means 20 connecting the hitch and the main support frame 11 is generally parallel to the ground surface 60. The lowered position is illustrated in dotted lines in FIG. 1. In this lowered position, the main support frame 11 is positioned below the axial height of the wheels 15 of the wheel assemblies 14 in close proximity with the ground surface 60. In this lowered position, the hitch means 20 is inclined to the ground surface 60 due to its being attached at one end to the hitch of the towing vehicle and at its other end to the main support frame 11 positioned at the lower level. The roller 31 extends partially beneath the support frame 11 so that when the bale carrier 10 is disposed in its lowered position the transverse frame member 13 and thus the towbar 25 are maintained slightly above the ground surface. When the towing vehicle backs toward the bale carrier 10, the forces from the towing vehicle are longitudinally transmitted to the support frame 11 without the hitch means 20 gouging into the ground surface.

Figure 1:
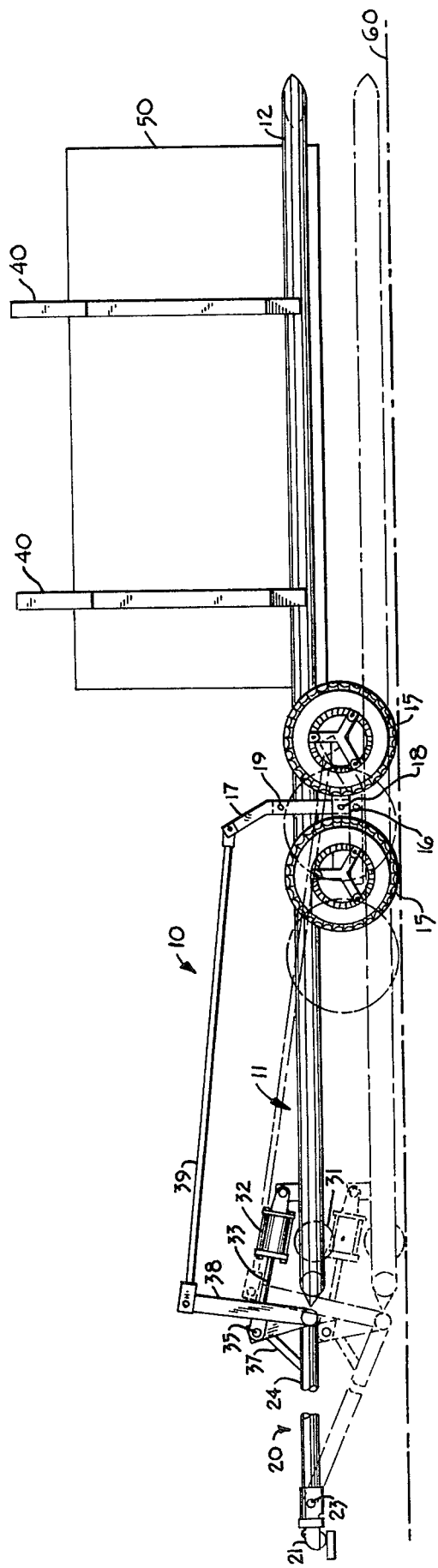
FIG. 1 is a view in side elevation of a bale carrier apparatus constructed according to the principles of the present invention.

The weight of the support frame 11 is sufficient to cause the main support frame 11 to move from its raised position to its lowered position upon release of pressure within the hydraulic cylinders 32. To pick up a bale, it is contemplated that the bale carrier, with the main support frame in its raised position, be positioned with the open end of the main support frame 11 adjacent the bale and longitudinally aligned therewith such that the axis of the cylindrical bale extends generally centrally between the support arms 12. The main support frame 11 is then dropped to its lowered position by releasing pressure within the hydraulic cylinders 32. While in its lowered position, the bale carrier 10 is backed under the bale or bales by the towing vehicle such that the support arms 12 extend longitudinally of the bale or bales on either side of their respective contact areas with the ground surface 60. The arch-shaped brace members 40 pass over and around the bale or bales but do not engage the bales as the carrier 10 is placed into position. When the bale carrier 10 is properly positioned, such that the support arm 12 extend beneath the full length of the bale or bales, hydraulic fluid is applied to the hydraulic cylinders 32 by hydraulic supply lines (not shown) attached to an appropriate hydraulic fluid source (also not shown) mounted to the towing vehicle. The applied hydraulic pressure causes movement of the piston rods 33 outwardly from the respective hydraulic cylinders 32. The hitch means 20 is thus caused to rotate relative to the main support frame 11 in a counterclockwise direction when viewed as in FIG. 1. The rotation of the towbar 25 is imparted to the actuating arms 38, uniformly applying rotational forces to the level arms 17 through the connecting rods 39. The rotational forces applied to the level arms 17 cause the wheel assemblies 14 to rotate relative to the main support frame 11. In actuality, however, the wheel assemblies 14 do not move relative to the ground surface 60, but the main support frame 11 is forced to raise from its lowered position to its raised position causing the longitudinal frame members to engage and lift the overlying bale or bales. Rotation of the towbar 25 also causes the hitch means 20 to be rotated relative to the main support frame 11 so that by the time the main support frame 11 is raised to its raised position, the hitch means 20 and the main support frame 11 will be aligned with one another as illustrated in FIG. 1. Locking means (not illustrated) may be employed to prevent lowering of the support frame to its lowered position during transporting of the carried bales.

While the preferred embodiment utilizes a support frame which is raised or lowered between positions defined in terms of their relation to the axial height of the wheel assemblies, it will be appreciated that the critical concept of the present invention is that support arms spaced at a distance less than the diameter of a bale to be transported, but sufficiently apart to slidably receive a bale therebetween when in a lowered position beneath the axial height of the bale, are to be selectively movable to a raised position so as to underlying and supportively engage the bale and lift it out of contact with the ground surface. The lowered position, of course, does not necessarily depend upon the axial height of the wheel assemblies, but rather, upon the axial height of the bale to be transported. Likewise, the support arms may be raised or lowered through various means other than the pivoting of the wheel assemblies relative to the support frame. One such alternative means is to apply a hydraulic power source directly to the support arms in order to raise or lower the support arms without interacting with the wheel assemblies.

While the preferred embodiment of the present invention has been disclosed, it will be understood that the present invention is not limited thereby but is limited only in scope by the appended claims.

What is claimed is:

1. A bale carrier apparatus for loading and transporting large cylindrical hay bales, comprising:
   a frame means having a front end and a rear end for receiving and supporting a cylindrical bale thereon, said cylindrical bale having a diameter substantially of a predetermined distance, said frame means including:
      a pair of spaced apart parallel support arms connected together at the said front end of the frame means and extending to free ends at the rear ends thereof, said support arms being spaced apart at a distance substantially less than said predetermined distance, and an upwardly and outwardly extending U-shaped member rigidly attached at each end thereof to said support arms, said member having an inner unobstructed passageway therethrough, said passageway having a lateral and a vertical distance of substantially more than said predetermined distance for allowing unobstructed passage of said cylindrical bale onto said support arms, said upwardly and outwardly extending U-shaped members further being laterally spaced beyond wheel assemblies pivotally affixed to said support arms; and
   a lever arm first actuating means connected to said frame and to said wheel assemblies for selectively raising and lowering said frame relative to said wheel assemblies between a lower position wherein the said support arms are substantially in contact with and parallel to the ground, and an upper position wherein the bales are not in contact with the ground.

2. A bale carrier apparatus as defined in claim 1, wherein a second upwardly and outwardly extending U-shaped member is attached at each end thereof to said support arms, said second upwardly and outwardly extending U-shaped member being spaced from the first said upwardly and outwardly extending U-shaped member, said second U-shaped member having a passageway therethrough having a vertical and lateral dimension of substantially more than said predetermined distance for allowing unobstructed passage of said cylindrical bale onto said support arms.

3. A bale carrier apparatus as defined in claim 2 wherein a Y-shaped hitch means for detachably connecting said trailer to a towing vehicle is located at the forward end of said trailer, said hitch means having a rear end pivotally mounted to the said front end of said frame, and having a second actuating means for raising and lowering said frame relative to said hitch means connected at the base thereof and extending generally uprightly therefrom;
   means connecting an upper portion of both said actuating means, whereby movement of said connecting means causes said frame to move vertically relative to said wheel assemblies and said Y-shaped hitch; and
   means for pivoting said support frame and said hitch means relative to each other, said pivoting means interconnected between said frame at the front end thereof and one of said actuating means at a position above the base thereof.

4. A bale carrier as described in claim 2 wherein said hitch means comprises a triangular frame including a pair of side drawbars joined at their forward ends and interconnected at their transversely spaced rear ends by a towbar; said towbar adjacent its outer ends pivotally connected to said frame front ends;
   wherein said second actuating means comprises at least one actuating arms secured at its base to said triangular frame adjacent to said towbar, extending generally upwardly therefrom and adapted for connection at its upper end to said connecting means;
   wherein said pivoting means comprises at least one hydraulic piston and cylinder unit; and
   wherein said ends of said elongate parallel support arms are tapered so that as said bale carrier apparatus is moved toward a hay bale, said bale is centered between said parallel support arms.

5. A bale carrier apparatus for loading and transporting large cylindrical hay bales, comprising:
   a main support frame having a front end and a rear end, consisting of a pair of elongate parallel support arms spaced apart a distance less than the diameter of a cylindrical hay bale and rigidly connected to said support arms by upwardly and outwardly extending inverted U-shaped cross member means sized to enable unobstructed passage of large cylindrical bales therebelow;
   a pair of wheel assemblies mounted on opposite sides of said support frame and substantially within the lateral dimension of said upwardly and outwardly extending U-shaped members, each wheel assembly including a generally upright first actuating means connected at its lower end to the remainder of its respective wheel assembly, and pivotally connected above said lower end to one of said support arms;
   Y-shaped hitch means including a coupler device at the forward end for detachable connection with a towing vehicle, and having further a rear end pivotally mounted to the front end of said support frame, said hitch means having a second actuating means connected at the base thereof to said hitch means and extending generally uprightly therefrom;
   means connecting an upper portion of said first actuating means to an upper portion of each of said second actuating means whereby movement of said connecting means causes said support frame to move vertically relative to said wheel assemblies and said Y-shaped hitch;
   means for pivoting said support frame and said hitch means relative to each other, said pivoting means interconnected between said support frame at the front end thereof and one of said actuating means at a position above the base thereof;
   wherein said hitch means comprises a triangular frame including a pair of side drawbars joined at their forward ends and interconnected at their transversely spaced rear ends by a towbar; said towbar adjacent its outer end pivotally connected to said support frame front ends;
   wherein second said actuating means comprises at least one member arm secured at its base to said triangular frame adjacent to said towbar, extended generally upwardly therefrom and adapted for connecting at its upper end to said connecting means; and
   wherein said pivoting means comprises at least one hydraulic piston and cylinder unit.

* * * * *